United States Patent
Salman et al.

(10) Patent No.: US 7,360,615 B2
(45) Date of Patent: Apr. 22, 2008

(54) PREDICTIVE ENERGY MANAGEMENT SYSTEM FOR HYBRID ELECTRIC VEHICLES

(75) Inventors: Mutasim A. Salman, Rochester Hills, MI (US); Jyh-Shin Chen, Troy, MI (US); Man-Feng Chang, Troy, MI (US)

(73) Assignee: General Motors Corporation, Detroit, MI (US)

( * ) Notice: Subject to any disclaimer, the term of this patent is extended or adjusted under 35 U.S.C. 154(b) by 201 days.

(21) Appl. No.: 10/864,670

(22) Filed: Jun. 9, 2004

(65) Prior Publication Data

US 2005/0274553 A1    Dec. 15, 2005

(51) Int. Cl.
*B60K 6/04* (2006.01)

(52) U.S. Cl. .......................... 180/65.2; 701/48; 903/940
(58) Field of Classification Search ............... 180/65.2, 180/65.3, 65.4; 701/22, 48, 70; 903/922, 903/940
See application file for complete search history.

(56) References Cited

U.S. PATENT DOCUMENTS

| | | | | |
|---|---|---|---|---|
| 5,627,752 | A * | 5/1997 | Buck et al. | .................... 701/35 |
| 5,650,931 | A * | 7/1997 | Nii | ................................. 701/22 |
| 5,716,301 | A | 2/1998 | Wild et al. | |
| 5,778,326 | A * | 7/1998 | Moroto et al. | ................. 701/22 |
| 5,804,947 | A * | 9/1998 | Nii et al. | ....................... 322/16 |
| 5,806,617 | A * | 9/1998 | Yamaguchi | ................. 180/65.2 |
| 5,832,400 | A | 11/1998 | Takahashi et al. | |
| 5,836,291 | A | 11/1998 | Kinugasa et al. | |
| 5,995,895 | A | 11/1999 | Watt et al. | |
| 6,016,457 | A | 1/2000 | Toukura et al. | |
| 6,098,005 | A | 8/2000 | Tsukamoto et al. | |
| 6,275,760 | B1 | 8/2001 | Saito et al. | |
| 6,314,347 | B1 | 11/2001 | Kuroda et al. | |
| 6,321,143 | B1 * | 11/2001 | Phillips et al. | ................. 701/22 |
| 2002/0107618 | A1 * | 8/2002 | Deguchi et al. | .............. 701/22 |
| 2005/0166580 | A1 | 8/2005 | Pfaeffle et al. | |
| 2005/0228553 | A1 | 10/2005 | Tryon | |
| 2006/0277898 | A1 | 12/2006 | McCarthy, Jr. | |
| 2006/0293822 | A1 | 12/2006 | Lattermann et al. | |

FOREIGN PATENT DOCUMENTS

| | | |
|---|---|---|
| EP | 0 745 788 | 12/1996 |
| GB | 2 393 404 | 3/2004 |

\* cited by examiner

*Primary Examiner*—Frank Vanaman

(57) ABSTRACT

A predictive energy management system for a hybrid vehicle that uses certain vehicle information, such as present location, time, 3-D maps and driving history, to determine engine and motor power commands. The system forecasts a driving cycle profile and calculates a driver power demand for a series of N samples based on a predetermined length of time, adaptive learning, etc. The system generates the optimal engine and motor power commands for each N sample based on the minimization of a cost function under constraint equations. The constraint equations may include a battery charge power limit, a battery discharge power limit, whether the battery state of charge is less than a predetermined maximum value, whether the battery state of charge is greater than a predetermined minimum value, motor power output and engine performance. The system defines the cost function as the sum of the total weighted predicted fuel consumed for each sample. The system then selects the motor and engine power commands for the current sample.

18 Claims, 3 Drawing Sheets

PREDICTIVE ENERGY MANAGEMENT SYSTEM FOR HYBRID ELECTRIC VEHICLES

BACKGROUND OF THE INVENTION

1. Field of the Invention

This invention relates generally to a predictive energy management system for a hybrid electric vehicle and, more particularly, to a predictive energy management system for a hybrid electric vehicle, where the system uses smart vehicle information, such as present location, time, 3-D maps, driving history, etc, to determine current and future engine and motor power commands.

2. Discussion of the Related Art

Hybrid electric vehicles use an engine and one or more electric motors to propel the vehicle to achieve better fuel economy and lower emissions than conventional vehicles. The engine output power does not have to equate power demands as in conventional vehicles. Generally the engine is used at high load demands and the motor is used at low load demands. The electric motor can supplement the power from the engine when the engine cannot sufficiently or efficiently provide the current power demands. The motor can also absorb the engine power and store it in a battery for later use. The engine can also be used to recharge the battery during prolonged use of the motor.

The battery state of charge (SOC) is an important consideration when determining if the motor should be used because a battery is more efficient if the battery state of charge is between an upper bound battery charge and a lower bound battery charge. The hybrid system also needs to be self-sustaining. Therefore, it is desirable to try and maintain the battery state of charge at or near a nominal value. Because it is desirable to have as small of a battery as feasible because of weight and cost requirements, it is necessary to be more selective with the charging and discharging of the battery to maintain the nominal battery state of charge as the motor is operated.

Known power control strategies for hybrid vehicles that determine the engine power and motor power are typically based on current driving conditions. Particularly, the hybrid vehicle controller will determine the combination of engine power and motor power depending on the current vehicle speed and torque requests from the vehicle operator in combination with other parameters, such as the battery state of charge. These power control inputs typically will be provided by look-up tables that have been generated for particular torque requests based on vehicle speed, battery state of charge, etc.

It is desirable to be able to predict future vehicle operating conditions and environment to make better use of the engine power and the motor power to further achieve better fuel economy and lower emissions. For example, if the vehicle controller knows that the vehicle will be traveling down a hill in the near future, it will know that the motor will be able to operate as a generator to charge the battery through regenerative braking when the vehicle goes down the hill. Therefore, it may be desirable to use more motor power than otherwise might be used as the vehicle approaches the hill so that the battery state of charge is first reduced to be later charged by the regenerative braking. Other future conditions, such as traffic information or highway travel, can also better prepare the vehicle controller for these driving conditions if they are known in advance.

SUMMARY OF THE INVENTION

In accordance with the teachings of the present invention, a predictive energy management system for a hybrid vehicle is disclosed, where the system uses vehicle input information, such as present location, time, 3-D maps, driving history, etc., to better determine the engine and motor power commands. The predictive energy management system includes a pattern learning and predictions process block that receives the input information, forecasts a driving cycle profile and calculates a driver power demand for a series of N samples of future time horizon starting from the present, where the N samples is based on a predetermined length of time, adaptive learning, etc.

The calculated driver power demand is then applied to a predictive control strategy process block that generates the engine and motor power commands for each N sample. The predictive control strategy block employs predetermined constraint equations to find the optimum sequence of power commands for the series of N samples. The constraint equations may include a battery charge power limit, a battery discharge power limit, a motor mechanical power output, whether the battery state of charge is less than a predetermined maximum value, whether the battery state of charge is greater than a predetermined minimum value, motor power output, engine performance and total emissions. The predictive control strategy process block defines a cost function as the sum of the total weighted predicted fuel consumed for each sample. The predictive control strategy process block then selects the motor and engine power commands for the current sample as the output commands.

Additional advantages and features of the present invention will become apparent from the following description and appended claims, taken in conjunction with the accompanying drawings.

DETAILED DESCRIPTION OF THE EMBODIMENTS

The following discussion of the embodiments of the invention directed to a predictive energy management system for a hybrid vehicle is merely exemplary in nature, and is in no way intended to limit the invention or its applications or uses.

Figure 1:
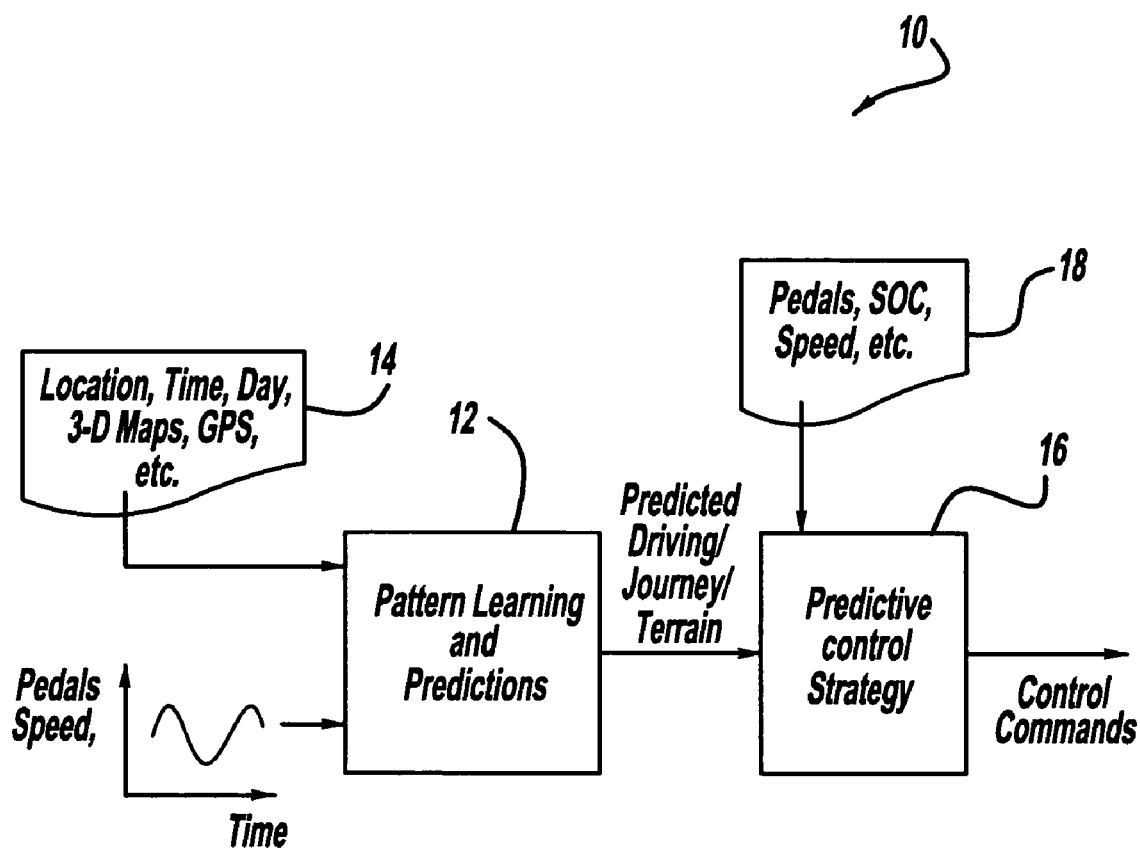
FIG. 1 is a block diagram of a predictive energy management system for a hybrid vehicle, according to an embodiment of the present invention.

FIG. 1 is a block diagram of a predictive energy management system 10 for a hybrid vehicle, according to an embodiment of the present invention. The system 10 includes a pattern learning and prediction process block 12 that receives various vehicle inputs from various sub-systems 14 including, but not limited to, time, location, terrain, vehicle speed, 3-D maps, day, pedal position, driver behavioral pattern, GPS inputs, etc. The pattern learning and prediction process block 12 forecasts the driving profile of vehicle speed versus time in a time horizon that consists of a predetermined number of next N samples. The terrain information combined with the speed profile can be used to predict the driving power demand at the wheel.

The system 10 also includes a predictive control strategy process block 16 that receives the current and predicted profile of the power demand at the wheel from the process block 12. As will be discussed in detail below, the predicted control strategy process block 16 calculates a sequence of power commands for each of the N samples that split the power between the electric motor or motors and the engine on the vehicle in an optimal manner. The predictive control strategy process block 16 receives inputs from various sub-systems 18 for the best fuel economy consistent with the discussion herein including, but not limited to, pedal position, the battery state of charge, the vehicle speed, etc.

Figure 2:
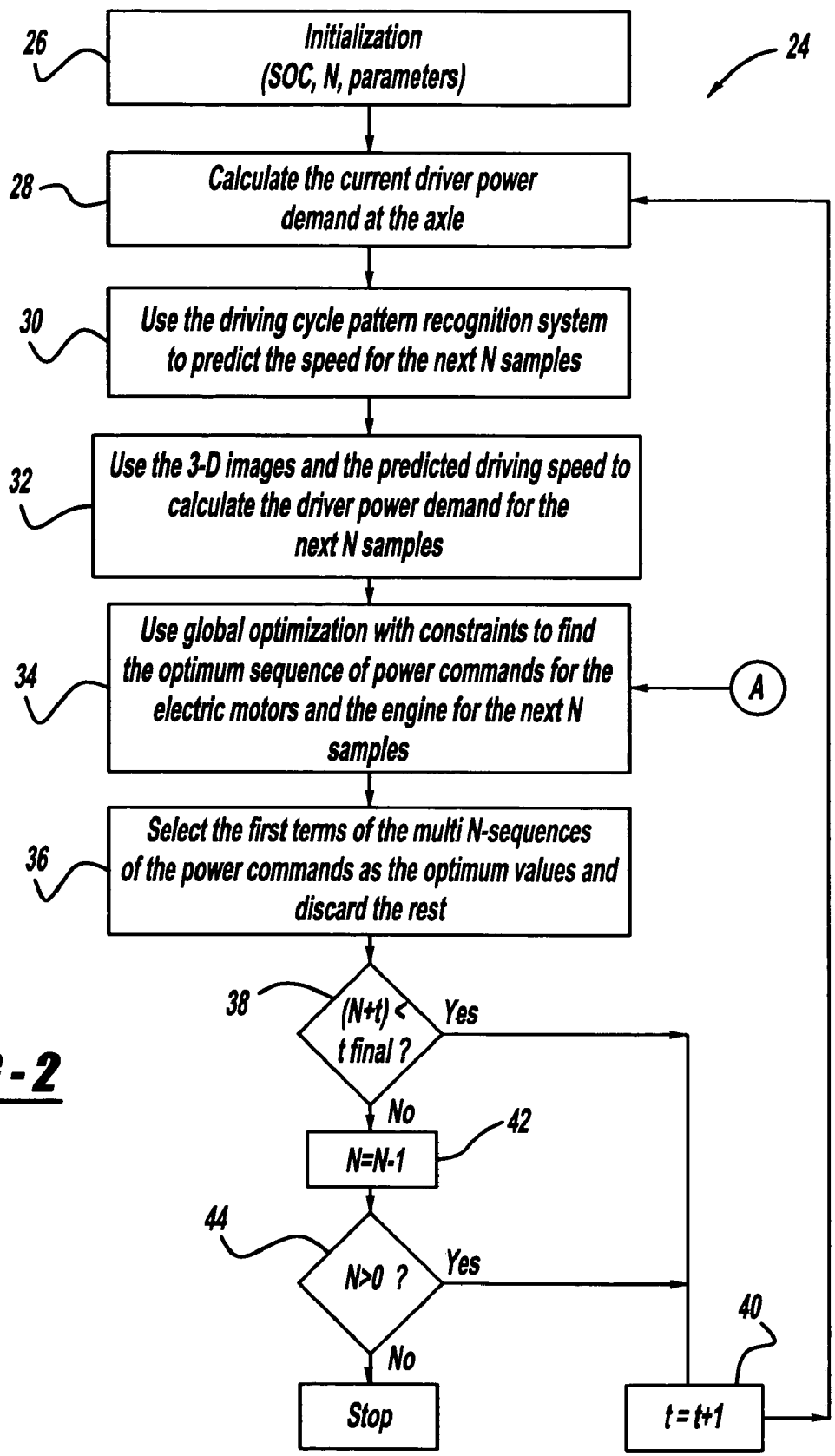
FIG. 2 is a flow chart diagram showing the operation of the predictive energy management system of FIG. 1.

FIG. 2 is a flow chart diagram 24 showing the operation of the predictive energy management system 10. The process block 12 provides an initialization at box 26 that includes receiving the inputs for the algorithm, including the battery state of charge (SOC), the number of N samples and the various inputs from the sub-system 14, discussed above. Based on the current driver input, vehicle speed, vehicle parameters and terrain information, the process block 12 calculates the current driver power demand $P_d$ at the axle or wheel at box 28 as:

$$P_d = F_{r,f}V + F_{r,r}V + F_a V + F_g V + MaV \quad (1)$$

In equation (1), M is the vehicle mass, V is the vehicle speed, $F_{r,f}$ and $F_{r,r}$ are the front and rear wheel rolling resistant forces, respectively, $F_a$ is the aerodynamic force, $F_g$ is the grade force and a is the vehicle acceleration.

The process block 12 then uses the data input of driving history, including day and time, and 3-D images of roads, to generate a scheme to forecast a driving cycle profile and to predict the vehicle speed V for the next N samples at box 30. As part of the driving cycle profile scheme, the final time of the driving trip (t final) is also predicted. The process block 12 then uses the vehicle parameters, the current and predicted driving cycle and the terrain to calculate a sequence of vehicle power demands at the axle for the next N samples at box 32.

Figure 3:
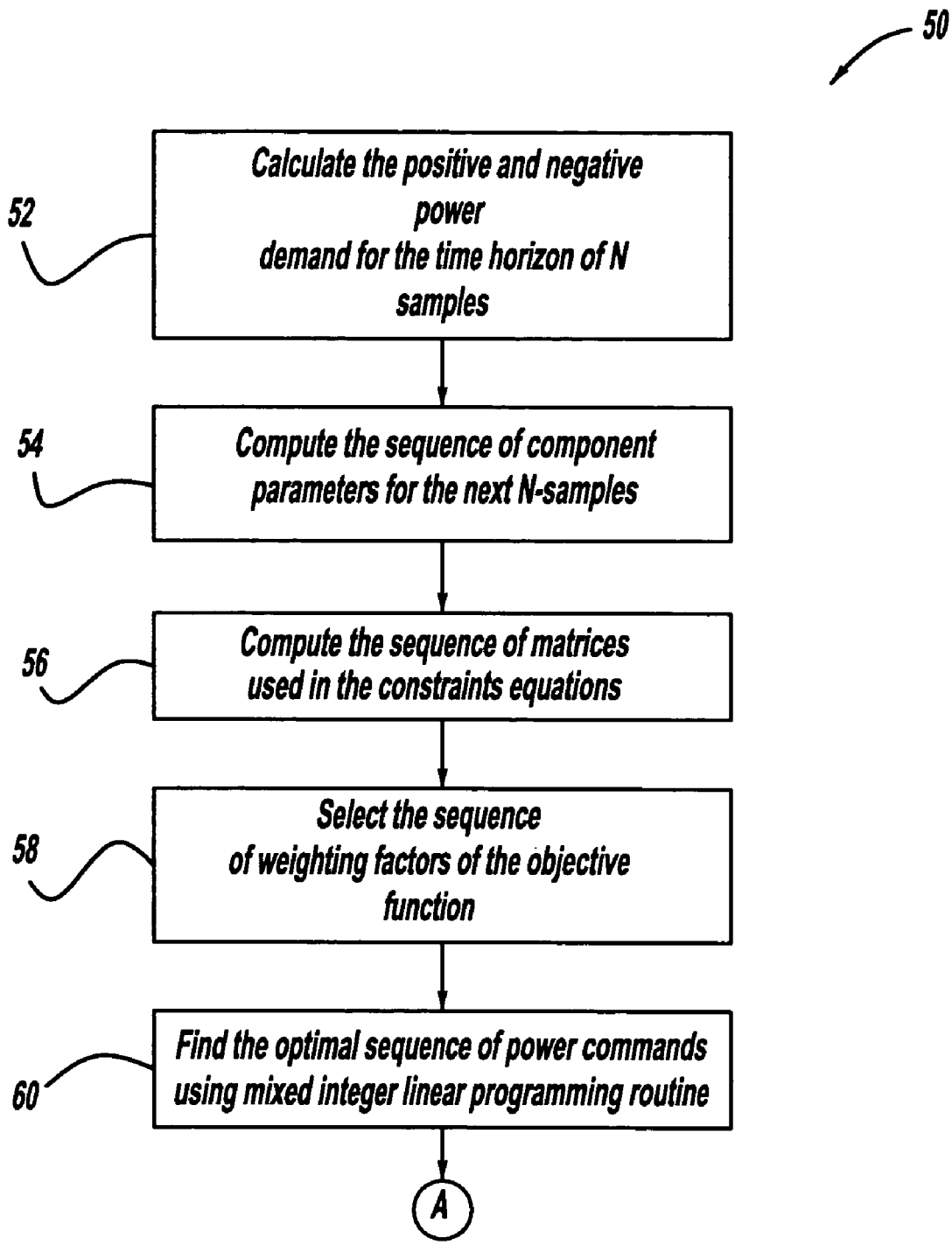
FIG. 3 is a flow chart diagram showing a process for determining the optimum sequence of power commands for the electric motor and engine in connection with the predictive energy management system of the invention.

The process block 16 then determines the optimum engine and motor power commands for each N sample at box 34 from the information provided by the process block 12. FIG. 3 below discusses the specific calculations that are performed by the process block 16 to provide the optimum sequence of power commands for the electric motor or motors and the engine for each of the remaining N samples. The number of N samples is determined by the horizon, which may be a certain time limit or, through predictive learning, time, distance, travel destination, etc. This computation is based on minimizing the total predicted weighted fuel economy to be consumed for the next N samples. The minimization takes into consideration the constraints of charge sustaining operations, battery state of charge bounds, and thermal and power component limits. The process block 16 then selects the first or current values of the resulting optimum control sequences as the current power commands for the electric motor and the engine at box 36.

The process block 16 then determines if the procedure should be terminated based on reaching the final time t-final or the last of the N samples. At decision diamond 38, the process block 16 determines whether the final time t-final has been reached. If the final time has not been reached, then the process block 16 sets t=t+1 at box 40 and returns to the box 28. If the final time has been reached, then the process block 16 sets N=N−1 at box 42 and determines if N is greater than zero at decision diamond 44. If N is greater than zero, then the process block 16 sets t=t+1 at the box 40, and returns to the box 28, otherwise the procedure is stopped.

FIG. 3 is a flow chart diagram 50 showing the process for determining the optimal predictive commands of the engine and motor power splits at the box 34. The process block 16 calculates the positive and negative parts of the power demanded at the axle for the next time horizon of N samples at box 52. The process block 16 uses equation (1) to determine the power demand, which can be either negative or positive depending on the driver's power request for each N sample. The process block 16 then computes the values for the sequence of component parameters for the next N samples at box 54. These parameters include A and B for the engine, C and D for the rear motor, E and F for the front motor, H and I for the battery in the charging mode, and J and K for the battery in the discharging mode. These component parameters are used in various constraint equations for determining the predicted engine and motor power requirements, as will be discussed below.

The process block 16 then computes a sequence of matrices that are used in developing the constraint equations for each of the N samples of the time horizon at box 56. These constraint equations are identified as non-limiting examples of equations that can be used to predict the future optimal engine power and motor power. Those skilled in the art may recognize other constraint equations that may also be beneficial, such as total emissions. In this example, the hybrid vehicle includes a front motor and a rear motor. However, this is by way of a non-limiting example in that any suitable number of motors can be used. Engine output power $P_{eng}(k)$, rear motor charging power $P_{m1\_ch}^{-}(k)$, front motor traction power $P_{m2}^{+}(k)$, and fuel that is consumed by the engine m(k) are used in the equations.

The constraint equations used by the process block 16 are defined as follows. The difference between the initial and the end of horizon of battery state of charge (SOC) is limited by:

$$SOC(t+N) - SOC(0) \geq d(t+N) \quad (2)$$

For the charge sustaining operation, the difference between the initial and final state of charge should be very small. This can be achieved by adding the difference between the initial and the end of horizon state of charge bounded by a value that depends on the end of horizon time. This bound should be very small because the end of horizon gets close to the final time. As a function of the control variables, this constraint equation is given as:

$$\Sigma phi(k) + \Sigma sigma(k) \geq d(t+N); \ phi(k) = H(k)*C(k)*P_{eng}(k) + [1/J(k)/C(k) - H(k)*C(k)]*P_{m1\_ch}^{-}(k) - H(k)*[E(k) - C(k)/dtr\_tract\_eff]*P_{m1}^{+}(k) + 0*m(k); \ and \ sigma(k) = -D(k)/J(k)/C(k) + 1/J(k)/E(k))*P_d^{-}(k) - F(k)/J(k)/E(k) - K(k)/J(k) - H(k)*C(k)* \ P_d^{+}(k)/dtr\_tract\_eff - H(k)*[D(k)+F(k)] - I(k) + [1/J(k)/C(k) - 1/dtr\_regen\_eff/J(k)/E(k)]*P_{m1\_br}^{-}(k) \quad (3)$$

The battery charge power is limited by:

$$P_{e1}^{-}(k) + P_{e2}^{-} \leq max\_charge \quad (4)$$

As a function of the control variables, this constraint equation is given as:

$$0*P_{eng}(k) + E(k)*P_{m1\_ch}^{-}(k) + 0*P_{m2}^{+}(k) + 0*M(k) \leq E(k)*C(k)*max\_charge + E(k)*D(k) + C(k)*F(k) - C(k)*P_{m2}^{-}(k) - E(k)*P_{m1\_br}^{-}(k) \quad (5)$$

The battery discharge power is limited by:

$$P_{e1}^{+}(k) + P_{e2}^{+} \leq max\_discharge \quad (6)$$

As a function of the control variables, this constraint equation is given as:

$$-C(k)*P_{eng}(k)+C(k)P_{m1\_ch}^{-}(k)+[E(k)-C(k)/\text{dtr\_tract\_eff}]*P_{m2}^{+}(k)+0*m(k) \leq \text{max\_discharge}-[D(k)+F(k)]-C(k)/\text{dtr\_tract\_eff}*P_{d}^{+}(k) \quad (7)$$

The rear motor mechanical power output is non-negative:

$$P_{m1}^{+} \geq 0; P_{m2}^{+} \geq 0 \quad (8)$$

As a function of the control variables, this constraint equation is given as:

$$P_{eng}(k)-P_{m1\_ch}^{-}(k)+P_{m2}^{+}(k)/\text{dtr\_tract\_eff}+0*m(k) \leq P_d^{+}(k)/\text{dtr\_tract\_eff} \quad (9)$$

The battery state of charge (SOC) at each instant in time should be less than the allowed maximum range.

$$SOC(k) \leq SOC_{max} \quad (10)$$

As a function of the control variables, this constraint equation is given for all k=t, t+1, . . . , t+N as:

$$-\text{phi}(t)-\text{phi}(t+1)-\ldots-\text{phi}(t+N-1) \leq SOC_{max}+SOC(t)+\text{sigma}(t+1)+\text{sigma}(t+2)+\ldots+\text{sigma}(t+N-1) \quad (11)$$

The battery state of charge (SOC) at each instant in time should be greater than the allowed minimum range.

$$SOC(k) \geq SOC_{min} \quad (12)$$

As a function of the control variables, this constraint equation is given for all k=t, t+1, . . . , t+N as:

$$-\text{phi}(t)-\text{phi}(t+1)-\ldots-\text{phi}(t+N-1) \leq -SOC_{min}+SOC(t)+\text{sigma}(t+1)+\text{sigma}(t+2)+\ldots+\text{sigma}(t+N-1) \quad (13)$$

The rear motor power output should be less than the maximum allowed value.

$$P_{m1}^{+} \leq P_{m1\_max}^{+} \quad (14)$$

As a function of the control variables, this constraint equation is given as:

$$-P_{eng}(k)+P_{m1\_ch}^{-}(k)-P_{m2}^{+}(k)/\text{dtr\_tract\_eff}+0*m(k) \leq P_{m1\_max}^{+}-P_d^{+}(k)/\text{dtr\_tract\_eff} \quad (15)$$

The equations that describe engine performance are given as:

$$-m(k)+A_1(gr(k)*w(k))P_{eng}(k)+B_1(gr(k)*w(k))X(k) \leq 0$$

$$-m(k)+A_2(gr(k)*w(k))P_{eng}(k)+B_2(gr(k)*w(k))X(k) \leq 0 \quad (16)$$

The process block 16 then defines a cost function as the sum of the total weighted predicted fuel consumed in the next N samples at box 58 as:

$$\text{Fuel} = \sum_{k=t}^{k=t+N} \alpha(k)m(k) \quad (17)$$

The weights α are selected based on the confidence in the predictions of the driving pattern and the future power demand. The sequence of weights is chosen based on several factors, such as credibility of the forecast, type of journey, battery size, etc. If the credibility of the predicted driving pattern is low, all weights corresponding to the future fuel consumption can be equal to zero. The cost function will be equal to the current fuel consumption.

The process block 16 uses a standard iterative method for mixed integer linear programming optimization solution to find the sequence of optimum values of the control variables for the next N samples at box 60. The sequence of control variables includes a binary value for turning the engine off when it is not being used, where X(k)=0 when the engine is off and X(k)=1 when the engine is on.

The process block 16 then computes the optimum rear motor traction power, the front motor regenerative braking power, and the rear motor regenerative braking power by using the following equations, respectively, as:

$$P_{m1}^{+}(k)=(-P_{eng}(k)+(P_d^{+}(k)-P_{m2}^{+})/(\text{dtr\_tract\_eff})+P_{m1\_ch}^{-}(k)) \; P_{m2}^{-}(k)=\min(P_{m2\_max}^{-}, P_d^{-}*\text{front}_{\_regen\_}\text{eff}) \; P_{m1_{13}br}^{-}(k)=\max(0,(P_d^{-}(k)-P_{m2}^{-}(k)/\text{front}_{\_regen\_}\text{eff})*\text{dtr\_regen\_eff} \quad (18)$$

The process block 16 then returns these values to select the current power commands at the box 34 as discussed above.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for providing power commands for a hybrid electric vehicle, said hybrid electric vehicle including an engine, at least one electric motor and a battery, said method comprising;

providing a plurality of vehicle inputs of vehicle operation and vehicle environment, said plurality of vehicle inputs including time and day information;

forecasting a driving cycle profile for each sample of a series of N samples based on the vehicle inputs, wherein forecasting a driving cycle profile includes using driving history including the time and day information and a travel destination;

determining a sequence of driver power demands for each sample of a series of the N samples based on the plurality of vehicle inputs and the travel destination;

determining an optimum sequence of power commands for the at least one electric motor and the engine for the series of samples, wherein determining an optimum sequence of power commands includes using a plurality of constraint equations to minimize a total predicted fuel economy, wherein using a plurality of constraint equations includes employing a separate constraint equation for all of a difference between an initial and end of horizon state of battery charge, a battery charge power limit, a battery discharge power limit, a battery state of charge less than a maximum limit, a battery state of charge greater than a minimum limit, motor output power, engine performance and total emissions; and selecting a current one of the power commands to operate the at least one electric motor and the engine.

2. The method according to claim 1 wherein determining a sequence of driver power demands includes determining a sequence of driver power demands based on vehicle parameters, current and predicted driving cycles and terrain.

3. The method according to claim 1 wherein determining an optimum sequence of power commands includes determining an optimum sequence of power commands by defining a cost function based on minimizing a total predicted weighted fuel economy to be consumed for the N samples.

4. The method according to claim 3 wherein the cost function uses weights selected from the group consisting of credibility of forecast, type of journey and size of battery.

5. The method according to claim 1 wherein determining an optimum sequence of power commands includes calculating a positive and negative part of power demanded at an axle of the vehicle.

6. The method according to claim 1 wherein providing a plurality of vehicle inputs includes providing a plurality of vehicle inputs selected from the group consisting of vehicle location, time, day, 3-D map inputs, vehicle speed and accelerator pedal position.

7. The method according to claim 6 further comprising forecasting a driving cycle profile for the N samples based on the vehicle inputs.

8. A method for providing power commands for a hybrid electric vehicle, said hybrid electric vehicle including an engine, at least one electric motor and a battery, said method comprising:
   providing a plurality of vehicle inputs of vehicle operation and vehicle environment, wherein providing a plurality of vehicle inputs includes providing a plurality of vehicle inputs selected from the group consisting of vehicle location, time, day, 3-D map inputs, vehicle speed and accelerator pedal position;
   forecasting a driving cycle profile for each sample of a series of N samples based on the vehicle inputs, wherein forecasting a driving cycle profile includes using driving history for the time and day input and a final driving time to forecast the driving cycle profile;
   determining a sequence of driver power demands for each sample of the series of N samples based on the plurality of vehicle inputs and the travel destination;
   determining an optimum sequence of power commands for the at least one electric motor and the engine for the series of samples, wherein determining an optimum sequence of power commands includes determining an optimum sequence of power commands by defining a cost function based on minimizing a total predicted weighted fuel economy to be consumed for the N samples and using a plurality of constraint equations to minimize the total predicted fuel economy, wherein using a plurality of constraint equations includes employing a separate constraint equation for all of a difference between an initial and end of horizon state of battery charge, a battery charge power limit, a battery discharge power limit, a battery state of charge less than a maximum limit, a battery state of charge greater than a minimum limit, motor output power, engine performance and total emissions; and
   selecting a current one of the power commands to operate the at least one electric motor and the engine.

9. The method according to claim 8 wherein determining a sequence of driver power demands includes determining a sequence of driver power demands based on vehicle parameters, current and predicted driving cycles and terrain.

10. The method according to claim 8 wherein the cost function uses weights selected from the group consisting of credibility of forecast, type of journey and size of battery.

11. The method according to claim 8 wherein determining an optimum sequence of power commands includes calculating a positive and negative part of power demanded at an axle of the vehicle.

12. A predictive energy management system for providing power commands in a hybrid electric vehicle, said hybrid electric vehicle including an engine, at least one electric motor and a battery, said controller comprising:
   a system for providing a plurality of vehicle inputs of vehicle operation and vehicle environment;
   a system for forecasting a driving cycle profile for each sample of a series of N samples based on the vehicle inputs, wherein the system for forecasting a driving cycle profile includes forecasting a driving cycle profile using driving history including the day and time information and a travel destination;
   a system for determining a sequence of driver power demands for each sample of a series of the N samples based on the plurality of vehicle inputs and the travel destination;
   a system for determining an optimum sequence of power commands for the at least one electric motor and the engine for the series of samples, wherein the system for determining an optimum sequence of power commands uses a plurality of constraint equations to minimize a total predicted fuel economy, wherein the plurality of constraint equations includes a separate constraint equation for all of a difference between an initial and end of horizon state of battery charge, a battery charge power limit, a battery discharge power limit, a battery state of charge less than a maximum limit, a battery state of charge greater than a minimum limit, motor output power, engine performance and total emissions; and
   a system for selecting a current one of the power commands to operate the at least one electric motor and the engine.

13. The predictive energy management system according to claim 12 wherein the system for determining a sequence of driver power demands determines the sequence of driver power demands based on vehicle parameters, current and predicted driving cycles and terrain.

14. The predictive energy management system according to claim 12 wherein the system for determining an optimum sequence of power commands determines the optimum sequence of power commands by defining a cost function based on minimizing a total predicted weighted fuel economy to be consumed for the N samples.

15. The predictive energy management system according to claim 14 wherein the cost function uses weights selected from the group consisting of credibility of forecast, type of journey and size of battery.

16. The predictive energy management system according to claim 12 wherein the system for determining an optimum sequence of power commands calculates a positive and negative part of power demanded at an axle of the vehicle.

17. The predictive energy management system according to claim 12 wherein the system for providing a plurality of vehicle inputs provides a plurality of vehicle inputs selected from the group consisting of vehicle location, time, day, 3D map inputs, vehicle speed and accelerator pedal position.

18. The predictive energy management system according to claim 17 further comprising a system for forecasting a driving cycle profile for the N samples based on the vehicle inputs.

* * * * *